Nov. 1, 1955        H. L. HESS        2,722,226
APPARATUS FOR REMOVING LEES FROM COFFEE BERRIES
Filed Dec. 21, 1953
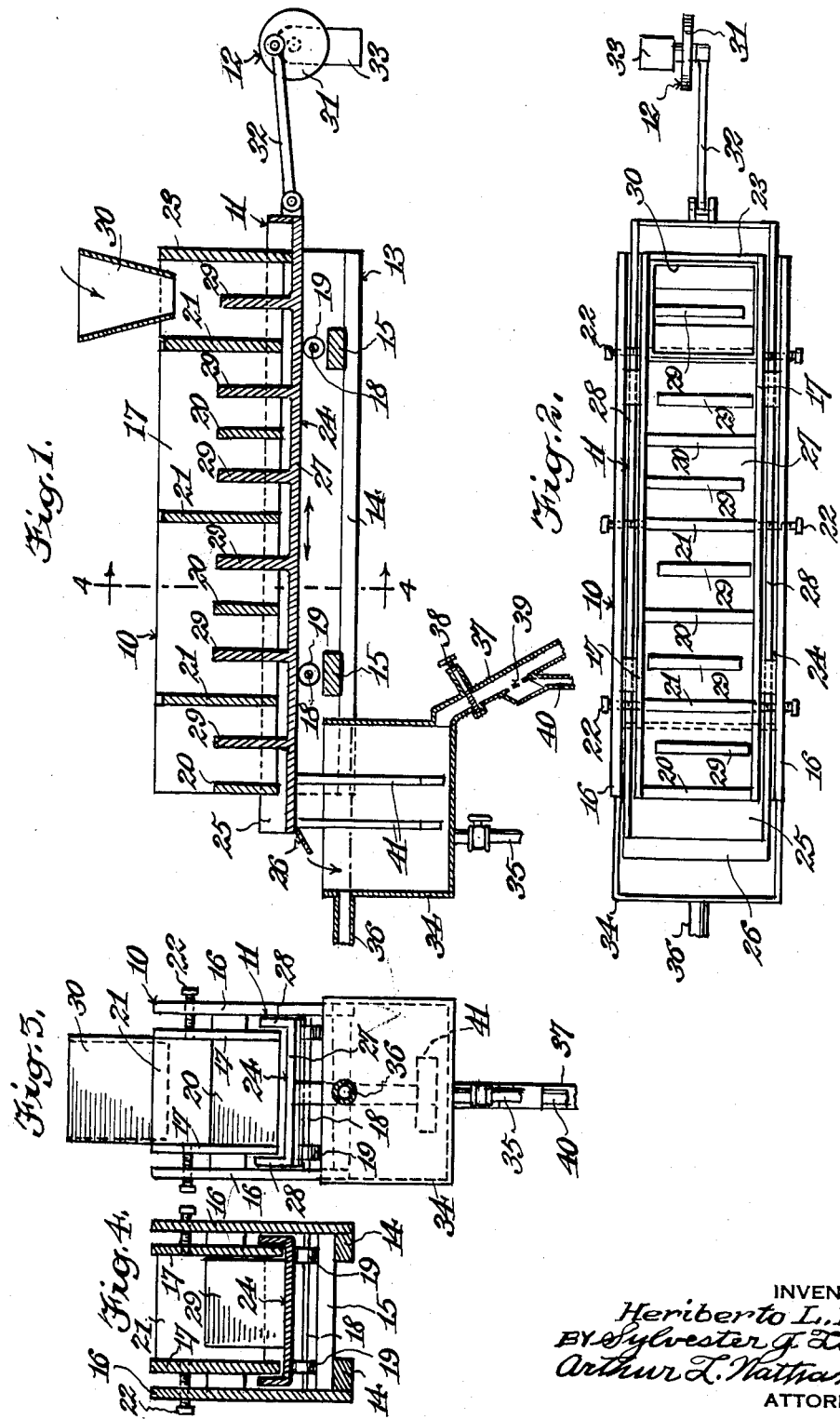
INVENTOR
Heriberto L. Hess
BY Sylvester J. Liddy &
Arthur L. Nathanson
ATTORNEYS

United States Patent Office 2,722,226
Patented Nov. 1, 1955

2,722,226

APPARATUS FOR REMOVING LEES FROM COFFEE BERRIES

Heriberto L. Hess, Hato Rey, Puerto Rico

Application December 21, 1953, Serial No. 399,357

5 Claims. (Cl. 134—83)

This invention relates to an apparatus for removing from ripe coffee berries whose outer hull or skin has been removed the lees, sometimes called lees liquor because of its dense and sticky character.

The principal object of the present invention is the provision of an apparatus of the indicated character which embodies novel features by virtue of which the lees is thoroughly removed from the coffee berry grains to assure a high grade marketable coffee product; and the apparatus being simple, yet efficient in construction, and effectual in operation for removing the lees expeditiously.

With the foregoing, other objects of this invention will appear when the following description is read in conjunction with the accompanying drawing, in which Fig. 1 is a longitudinal sectional view of the apparatus embodying the features of the present invention.

Fig. 2 is a top plan view of the apparatus.

Fig. 3 is an end view of the apparatus.

Fig. 4 is a transverse sectional view taken on the line 4—4 of Fig. 1.

As shown in the drawing, the apparatus includes a first stage agitating and washing unit comprising a stationary structure 10, a reciprocable structure 11, and means 12 for operating the structure 11. The stationary structure 10 comprises a base 13 of elongated formation and constructed of spaced parallel sills 14, spaced parallel cross-pieces 15 secured to the sills 14, upstanding supports 16 secured to the sills respectively, and vertical side panels 17 secured to the supports 16, respectively, spaced therefrom on the insides thereof, in spaced parallel relation to each other and the longitudinal axis of the structure 10, above the cross-pieces 15 and in spaced relation to the cross-pieces. The panels 17 are rectangular. Axles 18 have their opposite ends journaled in the supports 16. Each of the axles 18 has rollers 19 thereon. Vertical blades extend transversely between the panels 17, there being blades 20 and blades 21, each of which is rectangular and in the form of a plate in the present instance. These blades 20 and 21 are in spaced parallel relation to each other. The blades 20 are fixed to the panels 17 and extend upwardly from the bottom edge of the panels 17 to a point approximately half way up in relation thereto. The blades 21 are vertically adjustable, and of such dimensions in height as to extend from the bottom edge to the top edge of the panels 17 in one position of adjustment. Set screws 22, or the like, carried by the supports 16 and extending through the panels 17 secure the blades 21 in any desired vertical position of adjustment to regulate the flow of coffee berries through the apparatus. A panel 23 is secured to the panels 17 between the same at the front end of the structure 10, and serves as a baffle wall.

The reciprocable structure 11 comprises a shallow trough 24 whose front end is closed and whose rear end is open to provide an outlet 25 with a sloping ledge 26 on the bottom wall 27 between the side walls 28 of the trough. Vertical blades 29 are fixedly secured to the bottom wall 27 in equally spaced parallel offset relation to each other. The blades 29 thus arranged alternately provide clearance spaces between the blades and the panels 17. In height the blades 29 approximate the height of the blades 20. The blades 29 are interposed between the stationary blades 20 and 21 so as to cooperate therewith to agitate the raw lees covered coffee berries as they are fed into the trough 24 by means of a chute or hopper 30 at the front end and top of the structure 10. The trough 24 is arranged within the stationary structure 10 with its bottom wall 27 resting on the rollers 19, and the side walls 28 disposed respectively at the outside of the panels 17, as shown in Figs. 3 and 4. The structure 11 is thus mounted for reciprocatory movement with respect to the stationary structure 10. The means 12 for reciprocating the structure 11 comprises a crank disk 31 and a pitman 32 whose opposite ends are pivotally connected with the structure 11 and the disk 31 respectively, said disk being journaled in a bearing 33.

The apparatus also includes a second stage agitating and washing unit which comprises an open top tank or vessel 34 having a valved water inlet conduit 35 connected with the bottom of the tank 34 and communicating with the interior thereof, and overflow conduit 36 near the top of the tank in communication with the interior thereof, and a discharge conduit 37 connected with one side wall of the tank at the bottom thereof and communicating with its interior. The conduit 37 has a regulating gate valve 38, and a screen 39 communicating with a branch pipe 40 joined to the conduit 37. Inverted T-shaped agitators 41 reciprocate in the tank 34 by reason of their connection with the bottom 27 of the trough 24 and the disposition of the tank below said trough at the discharge end thereof, as shown most clearly in Fig. 1.

From the foregoing, it will be understood that as the raw lees covered coffee berries are fed into the trough 24 from the chute 30, the berries will be agitated by reason of the reciprocatory movement of the blades 29 in cooperation with the blades 20 and 21. Water is sprayed on the berries during their agitation causing the lees to be removed from the berries as some are caused to travel a hill and dale path while other berries are caused to travel in a laterally undulating path until discharged into the tank 34 from the outlet 25 of the trough 24. Then the berries almost free of lees are subjected to further agitation in the tank 34 by the reciprocatory motion of the agitators 41 while immersed in added clean water entering the tank through the conduit 35. The lees and other surface impurities are carried off from the tank 34 by way of the overflow 36. The lees free berries flow out of the tank through the conduit 37 while a certain amount of water is separated from the berries by the screen 39 to flow through the pipe 40 as the berries continue to flow to a suitable depository. It will now be appreciated that the hereinabove described and illustrated apparatus is one which may be installed, operated and maintained at comparatively low costs; and that the apparatus will remove the undesirable lees from a large quantity of raw coffee berries in a short period of time.

It is to be understood that the present invention is not restricted to the details above described, but includes all modifications and changes coming within the scope of the appended claims.

I claim:

1. An apparatus for removing lees from coffee berries whose outer hull has been removed, having the combination of a stationary structure, a reciprocable structure adapted to receive coffee berries and water arranged for reciprocation within said stationary structure, means for reciprocating said reciprocable structure, blades on said stationary structure which cooperate with blades on said reciprocable structure for agitating the coffee berries, all of said blades being disposed vertically, the blades on said reciprocable structure severally extending upwardly between adjacent blades on said stationary structure, the upper surfaces of the blades on the reciprocable structure being above the lower surfaces and below the upper surfaces of the blades on said stationary structure, certain of the blades on the stationary structure being vertically adjustable into different positions, means to secure said adjustable blades in their adjusted positions, means for introducing the coffee berries into said reciprocable structure at one end thereof, and the other end of said reciprocable structure having provision for discharging the coffee berries and water which may be delivered into said reciprocable structure.

2. An apparatus for removing lees from coffee berries whose outer hull has been removed, having the combination of a stationary structure having a base and spaced elongated panels fixed on said base, a reciprocable trough adapted to receive the coffee berries and water arranged for reciprocatory movement within said stationary structure above the base and under said panels, means for reciprocating said trough, blades extending crosswise between said panels and secured thereto, blades on said trough and movable therewith, the blades on the trough being cooperative with said stationary blades for agitating the coffee berries, the blades on said trough being alternately offset with respect to each other and being of less width than the distance between said panels providing clearance spaces between said blades and the panels alternately at opposite sides of the longitudinal axis of the trough, means for introducing the coffee berries into said trough at one end thereof, and the other end of the trough having provision for discharging the coffee berries and water which may be delivered into said trough.

3. An apparatus for removing lees from coffee berries whose outer hull has been removed, having the combination of a stationary structure, a reciprocable structure adapted to receive coffee berries and water arranged for reciprocation within said stationary structure, means for reciprocating said reciprocable structure, blades on said stationary structure which cooperate with blades on said reciprocable structure for agitating the coffee berries, means for introducing the coffee berries into said reciprocable structure at one end thereof, the other end of said reciprocable structure having provision for discharging the coffee berries and water which may be delivered into said reciprocable structure, an open top tank arranged to receive the coffee berries and water from the discharge end of the reciprocable structure, said tank having a water inlet means at the bottom, an overflow conduit at the top for discharging surface impurities and lees laden water, agitators depending from the reciprocable structure into said tank, and discharge control means communicating with the bottom of the tank for controlling the discharge of the coffee berries and for separating some of the water from said berries.

4. An apparatus for removing lees from coffee berries whose outer hull has been removed comprising the combination of a first stage agitating and washing unit including a reciprocable structure adapted to receive the coffee berries and having provision at one end for discharging the coffee berries, and a second stage agitating and washing unit comprising an open top tank arranged to receive the coffee berries from said reciprocable structure, water inlet means connected with the bottom of said tank, agitators on said reciprocable structure extending into said tank, and discharge control means communicating with the bottom of the tank for controlling the discharge of the coffee berries and for separating some of the water from said berries.

5. An apparatus as set forth in claim 4, wherein said tank has an overflow conduit at the top for discharging surface impurities and lees laden water.

References Cited in the file of this patent

UNITED STATES PATENTS

| 93,309 | Johnson | Aug. 3, 1869 |
| 183,586 | Miller | Oct. 24, 1876 |
| 2,035,564 | Noel | Mar. 31, 1930 |
| 2,143,610 | Muller | Jan. 10, 1939 |
| 2,624,059 | Pierce | Jan. 6, 1953 |

FOREIGN PATENTS

| 19,088 | Great Britain | 1902 |